(12) United States Patent
Tawada (10) Patent No.: US 9,998,822 B2
(45) Date of Patent: Jun. 12, 2018

(54) SIGNAL PROCESSING APPARATUS AND METHOD

(71) Applicant: CANON KABUSHIKI KAISHA, Tokyo (JP)

(72) Inventor: Noriaki Tawada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/628,714

(22) Filed: Jun. 21, 2017

(65) Prior Publication Data
US 2017/0374453 A1    Dec. 28, 2017

(30) Foreign Application Priority Data

Jun. 23, 2016 (JP) ................................ 2016-124800

(51) Int. Cl.
| | |
|---|---|
| *H04R 1/40* | (2006.01) |
| *H04R 3/00* | (2006.01) |
| *G01S 5/20* | (2006.01) |
| *H04S 1/00* | (2006.01) |

(52) U.S. Cl.
CPC .............. *H04R 1/406* (2013.01); *G01S 5/20* (2013.01); *H04R 3/005* (2013.01); *H04S 1/007* (2013.01); *H04R 2201/403* (2013.01); *H04R 2430/23* (2013.01); *H04R 2499/11* (2013.01)

(58) Field of Classification Search
None
See application file for complete search history.

(56) References Cited

U.S. PATENT DOCUMENTS

| | | | |
|---|---|---|---|
| 9,538,288 B2 | 1/2017 | Tawada | |
| 2002/0131580 A1* | 9/2002 | Smith | H04R 3/005 379/387.01 |
| 2005/0195988 A1* | 9/2005 | Tashev | H04R 3/005 381/92 |
| 2017/0064444 A1 | 3/2017 | Tawada | |

FOREIGN PATENT DOCUMENTS

JP    2001-204092 A    7/2001

\* cited by examiner

*Primary Examiner* — Paul Huber
(74) *Attorney, Agent, or Firm* — Carter, DeLuca, Farrell & Schmidt, LLP (57) ABSTRACT

There is provided a signal processing apparatus advantageous in terms of sound source separation performance. The signal processing apparatus includes a dividing unit configured to divide audio signal acquired by a plurality of audio acquisition units into components of a plurality of different frequency bands, and a processing unit configured to form, based on the audio signal, a plurality of directional beams having different directivities in accordance with a target direction and a target width. Each of the plurality of directional beams has directivities in different directions for the respective components of the frequency bands divided by the dividing unit.

12 Claims, 9 Drawing Sheets

SIGNAL PROCESSING APPARATUS AND METHOD

BACKGROUND OF THE INVENTION

Field of the Invention

The present invention relates to an audio signal processing technique.

Description of the Related Art

There is known a technique of forming a directivity in the direction of a target sound source by filtering using a plurality of microphone elements (microphone array), and separating a sound of the target sound source from acquired audio signals of a plurality of channels. Since it is difficult to narrow the beam width of the directivity, it is also difficult to accurately separate only the target sound source.

According to Japanese Patent Laid-Open No. 2001-204092, an overlapping area of the directivities of two directional microphones is formed, and a common component of two direction sounds obtained with the respective directivities is extracted, thereby obtaining a sound in the overlapping area narrower than the beam width of a single directivity.

However, especially when a target sound source is close to the direction of a non-target sound source, the sound source separation performance according to the conventional technique is still unsatisfactory, and it is desired to improve directivity control.

SUMMARY OF THE INVENTION

The present invention provides a technique advantageous in terms of sound source separation performance.

According to one aspect of the present invention, a signal processing apparatus comprises a dividing unit configured to divide audio signal acquired by a plurality of audio acquisition units into components of a plurality of different frequency bands, and a processing unit configured to form, based on the audio signal, a plurality of directional beams having different directivities in accordance with a target direction and a target width, wherein each of the plurality of directional beams has directivities in different directions for the respective components of the frequency bands divided by the dividing unit.

Further features of the present invention will become apparent from the following description of exemplary embodiments (with reference to the attached drawings).

DESCRIPTION OF THE EMBODIMENTS

Various exemplary embodiments, features, and aspects of the invention will be described in detail below with reference to the drawings.

Embodiments of the present invention will be described in detail below with reference to the accompanying drawings. Note that the present invention is not limited to the following embodiments, and these embodiments are merely practical examples when carrying out the present invention. In addition, not all combinations of features explained in the following embodiments are essential for the present invention to solve the problem.

Figure 1:
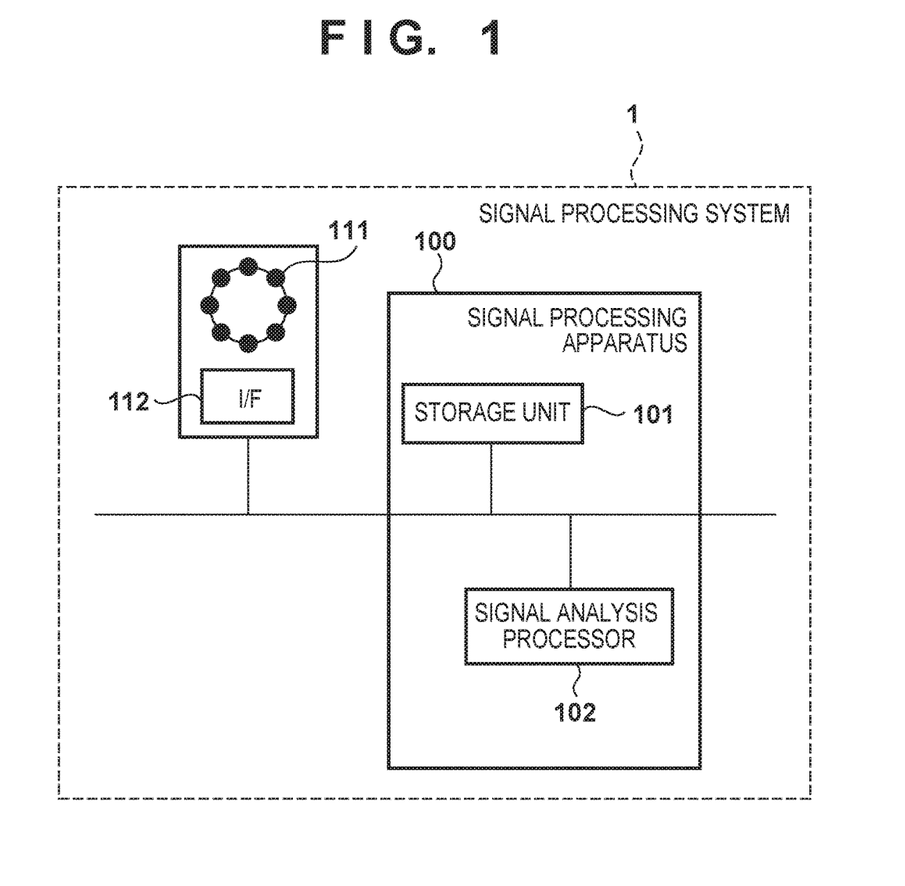
FIG. 1 is a block diagram showing the arrangement of a signal processing system according to an embodiment.

FIG. 1 is a block diagram showing the schematic system arrangement of a signal processing system 1 according to an embodiment. The signal processing system 1 includes a signal processing apparatus 100 and a plurality of audio acquisition units 111. The plurality of audio acquisition units 111 are implemented by, for example, a microphone array in which a plurality of microphone elements are equidistantly arranged in a circular shape. Audio signals of a plurality of channels acquired by the plurality of audio acquisition units 111 are transmitted to the signal processing apparatus 100 via an I/F 112 serving as an interface. The signal processing apparatus 100 includes a storage unit 101 for storing various data and a signal analysis processor 102 for performing signal analysis processing. The storage unit 101 holds audio signals acquired by the plurality of audio acquisition units 111.

Figure 10:
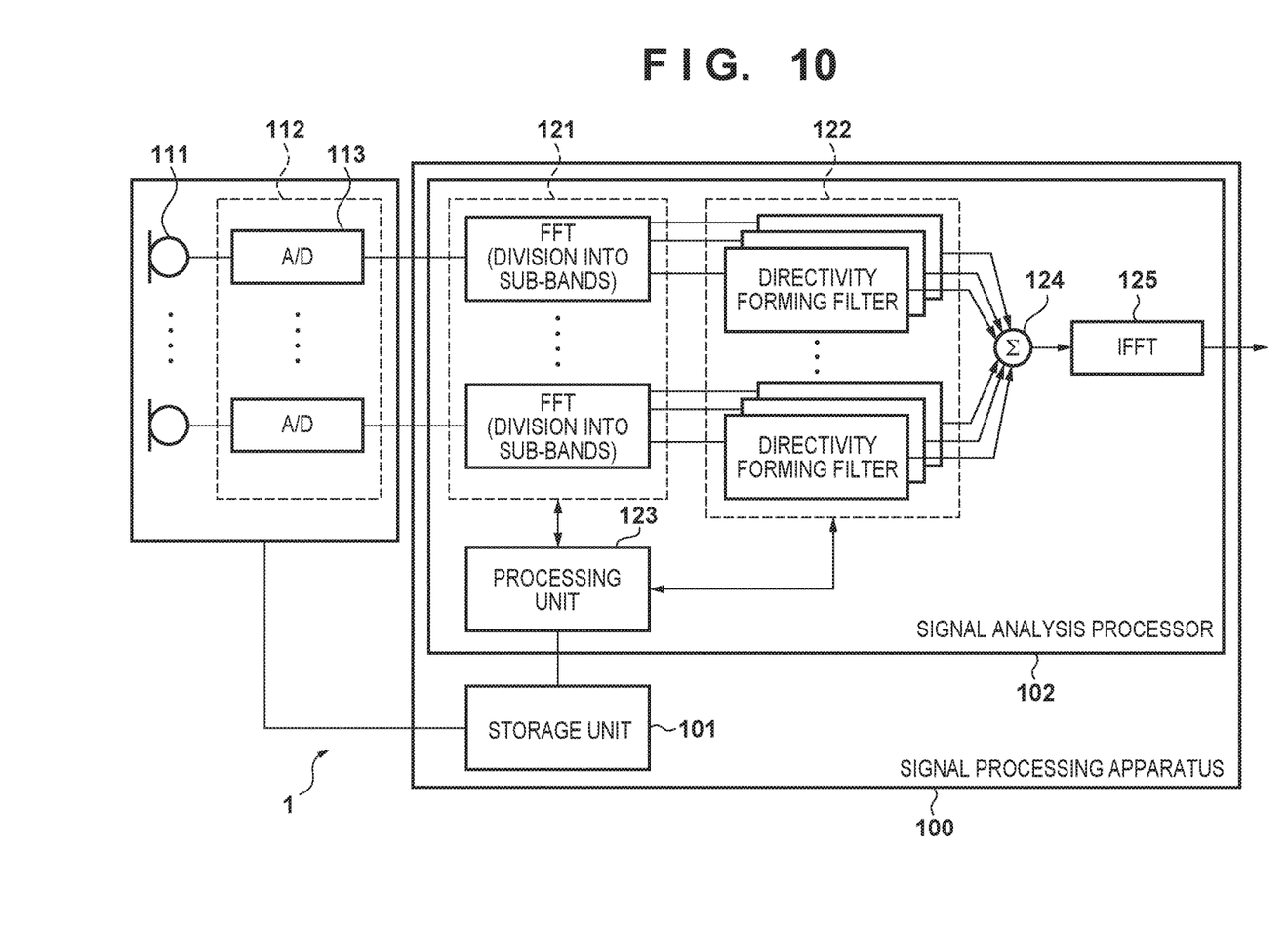
FIG. 10 is a functional block diagram showing the signal processing system according to the embodiment.

FIG. 10 shows the functional arrangement of the signal processing system 1. The I/F 112 includes, for example, A/D converters 113 each for converting a channel signal acquired by a corresponding one of the plurality of audio acquisition units 111 from an analog signal to a digital signal. Therefore, the audio signals of the channels are input to the signal processing apparatus 100 in a digital format. Alternatively, the audio signals of the channels from the A/D converters 113 may be stored in the storage unit 101. In the signal analysis processor 102, each FFT unit 121 performs Fourier transform by, for example, FFT for the audio signal of each channel, and divides the thus obtained signal into components of a plurality of frequency bands (sub-bands). The present invention is not limited to a specific division number. However, for example, the signal can be divided into components of three, low, medium, and high frequency bands. The sub-band signals are respectively input to directivity forming filters 122, and their spectra are operated. Filter coefficients in the directivity forming filters 122 are provided by a processing unit 123. The outputs of the directivity forming filters 122 are summed in an adder 124, and undergo inverse Fourier transform by, for example, IFFT in an IFFT unit 125. Thus, an audio signal in a time domain is output.

Figure 2A:
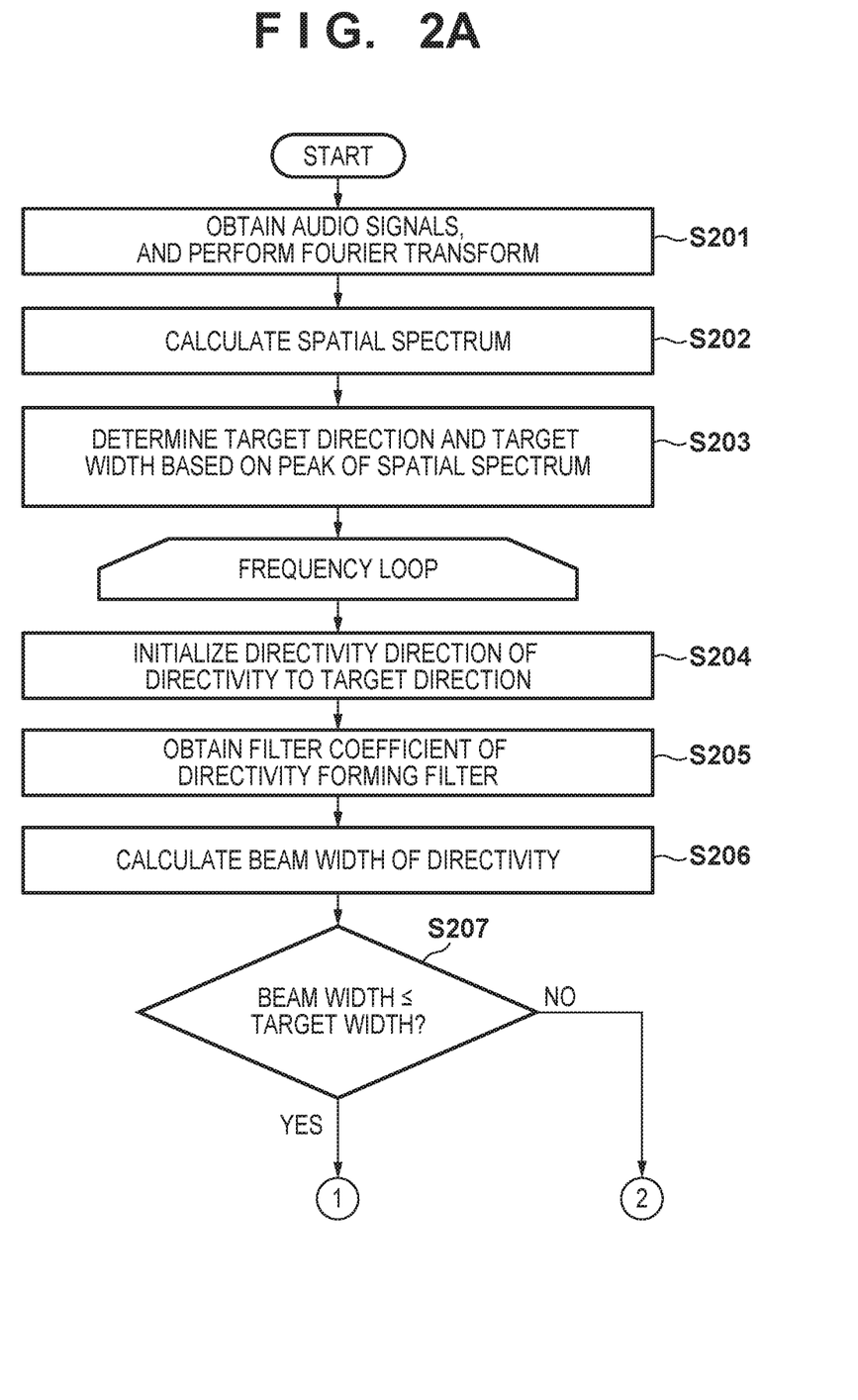
FIGS. 2A and 2B are flowcharts illustrating signal analysis processing according to the embodiment.
Figure 2B:
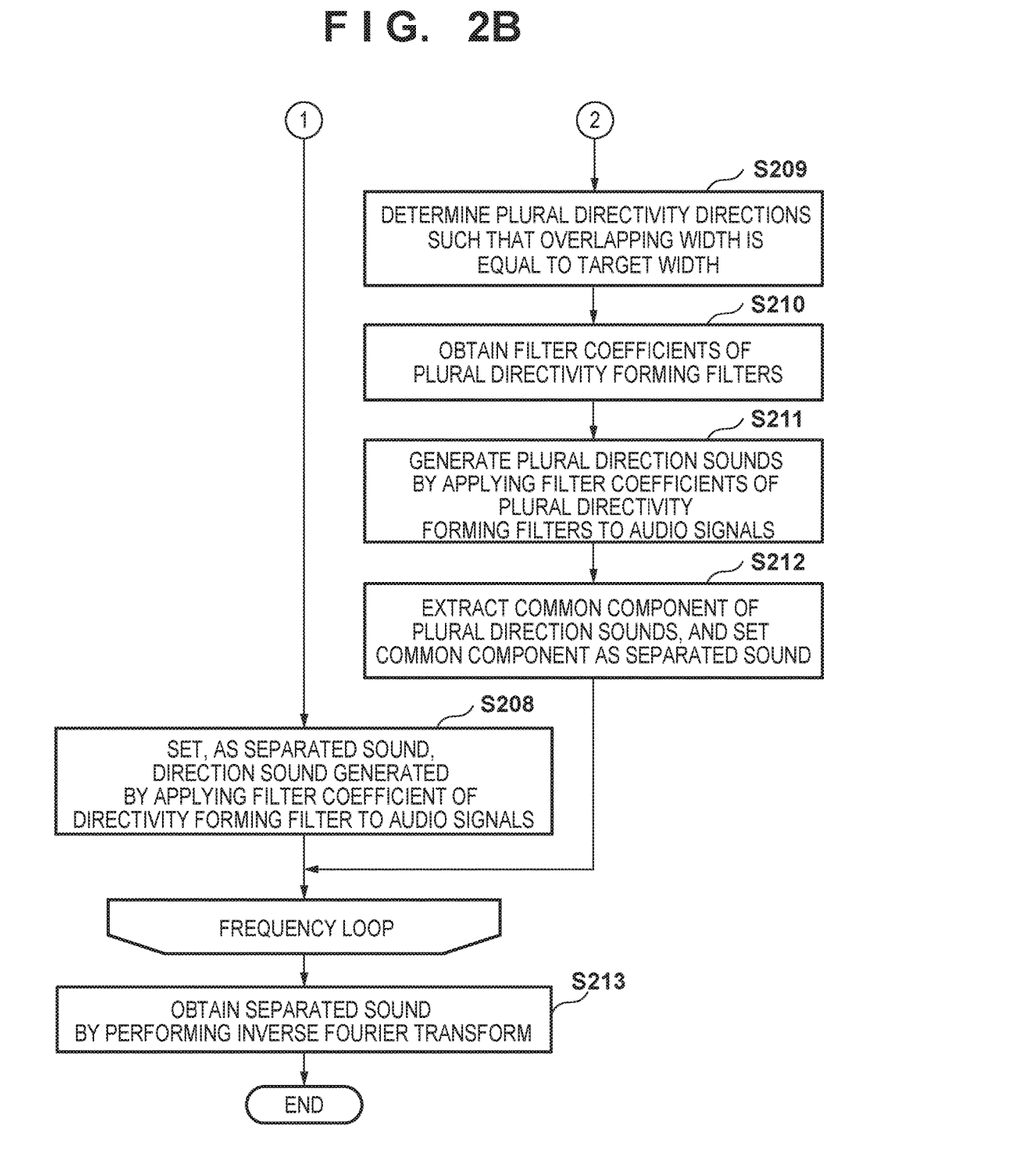

The schematic arrangement of the signal processing system 1 according to this embodiment has been explained. The signal analysis processing according to this embodiment will be described with reference to flowcharts shown in FIGS. 2A and 2B. Note that the processing of the flowcharts of FIGS. 2A and 2B is performed by the signal analysis processor 102, unless otherwise specified. The flowcharts of FIGS. 2A and 2B represent processing for each time block having a predetermined time length.

In step S201, M channel audio signals which have been transferred from the A/D converters 113 or read out from the storage unit 101 and acquired by M microphone elements (M channel microphone array) are obtained. The obtained M channel audio signals are input to the FFT units 121 on a channel basis. Each FFT unit 121 obtains z(f) as data (Fourier coefficients) in a frequency domain by performing processing (band dividing processing) of dividing a band into a predetermined number of sub-bands while performing FFT, where f represents the index of a sub-band and z(f) represents a vector having M elements.

In step S202, to detect the direction of the sound source of a sound included in each audio signal in a subsequent step, the processing unit 123 calculates a spatial spectrum $P(f, \theta)$ which forms the peak of sensitivity in the sound source direction. For this calculation processing, a spatial correlation matrix R(f) given by equation (1) below as a statistic representing the spatial characteristic of the audio signal, and an array manifold vector (AMV) as a transfer function between a sound source in each direction (azimuth $\theta$) and each microphone element are used.

$$R(f) = E[z(f)z^H(f)] \quad (1)$$

where E represents an expected value, and superscript H represents complex conjugate transposition.

For example, a spatial spectrum $P_{MV}(f, \theta)$ based on a minimum variance method is obtained by:

$$P_{MV}(f, \theta) = \frac{1}{a^H(f, \theta)R^{-1}(f)a(f, \theta)} \quad (2)$$

where $a(f, \theta)$ represents the AMV, and is data (Fourier coefficient) in the frequency domain and a vector having M elements.

A matrix obtained by arranging eigenvectors, among M eigenvectors of the spatial correlation matrix R(f), which correspond to a noise partial space is represented by $E_n$, and in consideration of the orthogonality with the AMV $a(f, \theta)$ belonging to a signal partial space, a spatial spectrum $P_{MU}(f, \theta)$ based on the MUSIC method is obtained by:

$$P_{MU}(f, \theta) = \frac{a^H(f, \theta)a(f, \theta)}{a^H(f, \theta)E_n E_n^H a(f, \theta)} \quad (3)$$

By performing calculation, as indicated by $P(f, \theta) = P_{MV}(f, \theta)$ [equation (2)] or $P(f, \theta) = P_{MU}(f, \theta)$ [equation (3)], while changing $\theta$ of $a(f, \theta)$ by increments of 1° within the range of, for example, −180° to 180°, spatial spectra in all the horizontal directions are obtained. Note that depending on the structure of the microphone array used to record the audio signals, the AMV $a(f, \theta)$ can be calculated at an arbitrary resolution by a theoretical equation for a free space, a rigid ball, or the like.

Note that the AMV held in advance in the storage unit 101 is obtained and used. If the arrangement of the microphone array is different, the AMV is also different. Thus, the type ID of the microphone array used for audio acquisition may be recorded as additional information of the audio signals at the time of audio acquisition, and the AMV corresponding to the microphone array may be used.

In step S203, the processing unit 123 determines the direction of a target sound source based on the spatial spectrum $P(f, \theta)$ calculated in step S202, and determines the direction as a target direction $\theta_s$ (directivity direction) of the directivity. In addition, the processing unit 123 determines an angle width representing the spread of a directional beam having the target direction $\theta_s$ as its center, which includes only the target sound source without including any non-target sound source, and determines the width as a target width $\alpha_s$ of the directivity.

First, an average spatial spectrum $P(\theta)$ is obtained by averaging $P(f, \theta)$ at frequencies. The frequencies used for averaging may be all the frequencies or frequencies in a distinguished band of the audio signals. If the average spatial spectrum in the current time block is represented by $P(\theta, t)$ using an index t of the time block, an average spatial spectrum in a time block n blocks before the current time block is represented by $P(\theta, t-n)$.

It is possible to detect the directions of main sound sources by detecting, from each of the average spatial spectra $P(\theta, t-n)$ to $P(\theta, t)$ in a plurality (n) of time blocks, a direction in which a large peak is obtained. The target sound source is determined from the main sound sources, and the direction of the target sound source is determined as the target direction $\theta_s$ of the directivity. Note that the direction of the target sound source may be determined from the average spatial spectra in all the time blocks of the audio signals. As a determination method, the direction of the peak closest to the front direction or the direction of the largest peak may be determined as the direction of the target sound source.

As a method of determining the target width $\alpha_s$, for example, an angle width from the target direction to the direction of a closest non-target sound source may be determined as the target width. Alternatively, a direction within the angle width from the target direction to the direction of the closest non-target sound source, in which the largest value of the average spatial spectra in the n time blocks is smallest, is detected, and a value twice an angle width from the detected direction to the target direction may be determined as the target width.

Figure 3:
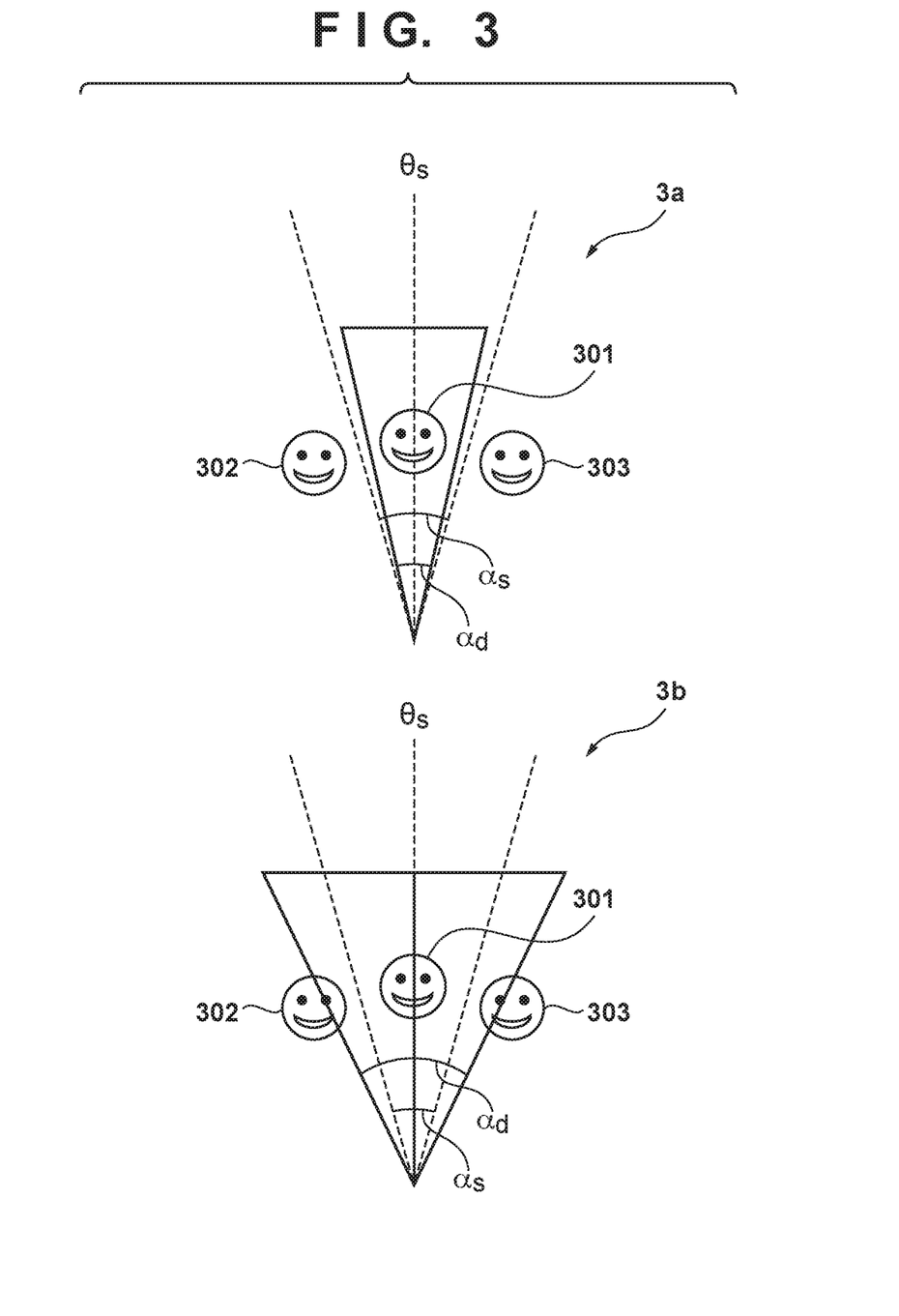
FIG. 3 is a view for explaining an example of directivity direction control according to the embodiment.

In FIG. 3, 3a shows an example in which the target direction $\theta_s$ is the front direction. A sound source 301 represents a target sound source, and sound sources 302 and 303 represent non-target sound sources. The reason why the target width $\alpha_s$ is defined by setting the target direction $\theta_s$ as the center is that an overlapping area of a plurality of directional beams in a subsequent step is assumed to be also formed by setting the target direction $\theta_s$ as the center.

Note that if the storage unit 101 holds a video signal captured by an image capturing unit (not shown) in addition to the audio signal, a target direction and a target width may be determined based on the video signal. That is, an object which can serve as a sound source is detected by performing video recognition for the video signal. For example, an object which can generate a sound, such as a vehicle, animal, musical instrument, or person, is detected by applying known machine learning or face recognition. Alternatively, collision between objects or the like may be detected based on inversion of a motion vector. A target sound source can be determined from the objects recognized by video recognition, and the center of the object detection frame can be determined as the target direction $\theta_s$ of the directivity. As a method of determining the target sound source, an object whose detection frame (horizontal pixel count) in video recognition is largest or an object closest to the center of the video signal may be determined as the target sound source. Furthermore, as a method of determining the target width $\alpha_s$, an angle width corresponding to the object detection frame of the target sound source may be determined as the target width. In addition, the user may perform, via a GUI (not shown), selection of the target direction $\theta_s$ and adjustment of the target width $\alpha_s$.

Steps S204 to S212 indicate processing (frequency loop) repeated for each sub-band. In step S204, the processing unit 123 initializes a directivity direction in directivity formation to the target direction $\theta_s$. In step S205, the processing unit 123 obtains a filter coefficient for forming the main lobe of the directivity in the target direction $\theta_s$. In this example, $w_s(f)$ corresponding to the target direction $\theta_s$ is obtained from the filter coefficients of the directivity forming filters held in advance in the storage unit 101. The filter coefficient (vector) $w_s(f)$ indicates data (Fourier coefficient) in the frequency domain and is formed by M elements. Note that if the arrangement of the microphone array is different, the filter coefficient is also different. Thus, the type ID of the microphone array used for sound recording may be recorded as additional information of the audio signals at the time of sound recording, and the filter coefficient corresponding to the microphone array may be used.

The AMV is generally used to calculate the filter coefficient of the directivity forming filter. If, for example, Delay-and-Sum Beam Forming (DSBF) is used as a method of forming the main lobe of the directivity in the target direction $\theta_s$, a filter coefficient is obtained by $w_s(f)=a_s(f)/(a_s^H(f) a_s(f))$ where $a_s(f)$ represents the AMV in the direction $\theta_s$.

In step S206, the processing unit 123 calculates the beam pattern of the directivity using the filter coefficient $w_s(f)$ in directivity formation obtained in step S205 and the AMV $a(f, \theta)$, and calculates a beam width $a_d$ of a single directional beam from the calculated beam pattern. A value $b(f, \theta)$ in the direction of the azimuth $\theta$ of the beam pattern is obtained by:

$$b(f,\theta)=w_s^H(f)a(f,\theta) \qquad (4)$$

By calculating $b(f, \theta)$ while changing $\theta$ of $a(f, \theta)$ by increments of 1° within the range of, for example, −180° to 180°, beam patterns in all the horizontal directions are obtained.

In this embodiment, as for the beam patterns calculated by equation (4), a value twice the angle width from the directivity direction to a direction in which an attenuation becomes equal to a predetermined value (for example, 3 dB) is defined as a beam width $\alpha_d(f)$ of the directional beam. A sound outside the range of the beam width is suppressed. The beam width $\alpha_d(f)$ depends on the frequency, and generally intends to be wider at a lower frequency. If the direction in which the attenuation from the directivity direction becomes equal to the predetermined value is referred to as the beam width direction of the directivity, the two equal sides of an isosceles triangle schematically representing the directivity in FIG. 3 correspond to the beam width direction.

In step S207, the processing unit 123 determines whether the beam width $\alpha_d(f)$ calculated in step S206 is equal to or smaller than the target width $\alpha_s$ determined in step S203 ($\alpha_d(f) \leq \alpha_s$). If the beam width calculated in step S206 is equal to or smaller than the target width determined in step S203, the process advances to step S208; otherwise, the process advances to step S209. By considering from the high frequency band in the frequency loop, in the high frequency band in which the beam width of the directivity is narrow, the beam width $\alpha_d(f)$ is equal to or smaller than the target width $\alpha_s$, as shown in 3a of FIG. 3. In this case, the process advances to step S208.

In step S208, the filter coefficient $w_s(f)$ of the directivity forming filter obtained in step S205 is applied to the Fourier coefficient $z(f)$ of the M channel audio signals obtained in step S201, thereby generating a direction sound $Y_s(f)$ in the target direction $\theta_s$, which is data (Fourier coefficient) in the frequency domain, as given by:

$$Y_s(f)=w_s^H(f)z(f) \qquad (5)$$

If the beam width $\alpha_d(f)$ of the directivity is equal to or smaller than the target width $\alpha_s$, if the direction sound $Y_s(f)$ obtained with the directivity in the target direction $\theta_s$ is used intact as a separated sound $X(f)$, it is possible to separate a sound of the target sound source by suppressing sounds of the non-target sound sources. Note that $X(f)$ indicates data (Fourier coefficient) in the frequency domain.

In the next frequency loop, for example, the medium frequency band in which the beam width of the directivity is medium is processed. In this case, the beam width $\alpha_d(f)$ is wider than the target width $\alpha_s$, as shown in 3b of FIG. 3. Even if a direction sound is obtained with the directivity in the target direction $\theta_s$, sounds of the non-target sound sources 302 and 303 are undesirably mixed. In this case, the process advances to step S209. In steps S209 to S212, processing of forming a plurality of directional beams so that the center direction of the overlapping area of the plurality of directional beams faces in the target direction and the overlapping width of the overlapping area is equal to or smaller than the target width. The center direction of the overlapping area indicates, for example, the center direction when viewed from the origin of the microphone array formed by the plurality of audio acquisition units 111. For example, if the microphone array is formed by equidistantly arranging the plurality of audio acquisition units 111 in a circular or spherical shape, the center of the circle or sphere can serve as the origin of the microphone array. Alternatively, if the microphone array is formed by equidistantly arranging the plurality of audio acquisition units 111 in a linear shape, the middle point of the straight line can serve as the origin of the microphone array. In this embodiment, an overlapping area of a plurality (for example, directivity count D=2) of directional beams is formed, and a sound in the overlapping area is extracted, thereby obtaining a sound of the target sound source, which cannot be separated by a single directivity. In step S209, if an overlapping area 304 of a plurality of directional beams is formed, as shown in 4a of FIG. 4, a plurality of directivity directions $\theta_d(f)$ [d=1 to D] are determined so that an overlapping width $\alpha_p$ of the overlapping area becomes equal to or smaller than the target width $\alpha_s$. An area surrounded by the directions of the beam widths of the plurality of directional beams, as shown in 4a of FIG. 4, is set as an overlapping area.

Figure 4:
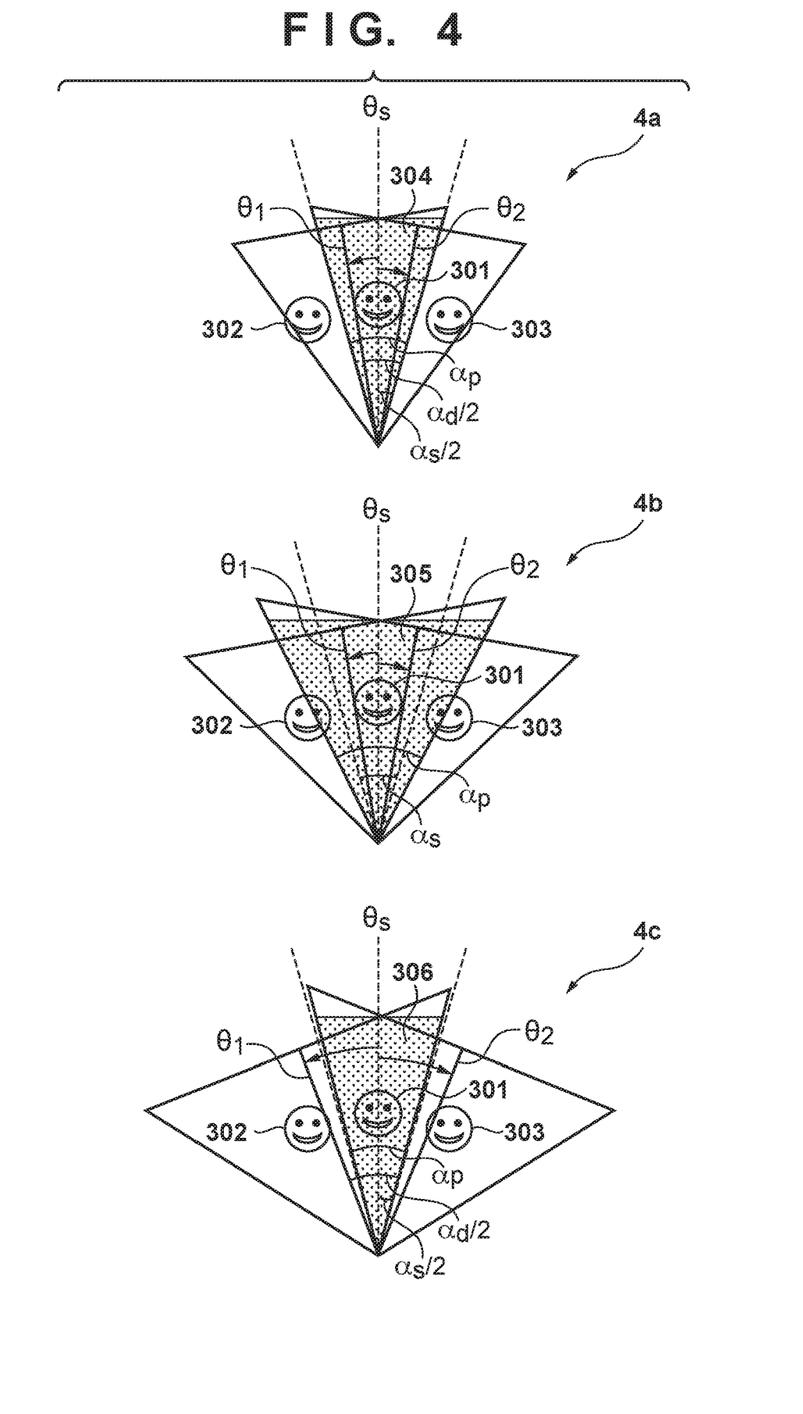
FIG. 4 is a view for explaining the example of directivity direction control according to the embodiment.

Referring to 4a of FIG. 4, the overlapping width $\alpha_p$ can be set as the target width $\alpha_s$ by determining the plurality of directivity directions $\theta_d(f)$ [d=1 to D], as given by:

$$\begin{cases} \theta_1(f) = \theta_s + (\alpha_d(f) - \alpha_s)/2 \\ \theta_2(f) = \theta_s - (\alpha_d(f) - \alpha_s)/2 \end{cases} \qquad (6)$$

The left direction with respect to the front direction is set as the positive direction of the azimuth.

In step S210, the processing unit 123 obtains a plurality of filter coefficients for forming the main lobes of directivities in the plurality of directivity directions $\theta_d(f)$ [d=1 to D] determined in step S209, similarly to step S205. In this processing, a plurality of $w_d(f)$ [d=1 to D] corresponding to the plurality of directivity directions $\theta_d(f)$ [d=1 to D] are obtained from the filter coefficients of the directivity forming filters held in advance in the storage unit 101.

In step S211, the filter coefficients $w_d(f)$ [d=1 to D] of the plurality of directivity forming filters obtained in step S210 are applied to the Fourier coefficient $z(f)$ of the M channel audio signals obtained in step S201, similarly to step S208. This generates a plurality of direction sounds $Y_d(f)$ [d=1 to D] which correspond to the plurality of directivity directions $\theta_d(f)$ [d=1 to D] and indicate data (Fourier coefficients) in the frequency domain, as given by:

$$Y_d(f) = w_d^H(f) z(f) [d=1 \text{ to } D] \quad (7)$$

In step S212, a common component of the plurality of direction sounds $Y_d(f)$ [d=1 to D] generated in step S211 is extracted by, for example, equation (8) below, and set as a separated sound $X(f)$. This corresponds to extraction of a sound in the overlapping area 304 having the overlapping width $\alpha_p$ (=target width $\alpha_s$) narrower than the beam width $\alpha_d(f)$, as shown in 4a of FIG. 4, and a sound of the target sound source 301 is separated by suppr0essing sounds of the non-target sound sources 302 and 303.

$$X(f) = \min(|Y_d(f)|) * \exp(j \arg(Y_1(f))) \quad (8)$$

The absolute value symbol and arg represent the amplitude and phase of the Fourier coefficient, respectively, and the minimum value of the amplitudes $|Y_d(f)|$ [d=1 to D] of the sounds in all the directions is obtained by the min function. Note that in extraction of a common component, an average value or median may be used as the amplitude, instead of the minimum value of the amplitudes of the sounds in all the directions. Although the first direction sound $Y_1(f)$ is used as the phase, another direction sound $Y_d(f)$ [d=2 to D] or the direction sound $Y_s(f)$ in the target direction $\theta_s$ may be used. Alternatively, a common component may be extracted using a cross-spectrum of the plurality of direction sounds $Y_d(f)$ [d=1 to D].

In the next frequency loop, the low frequency band is processed. In the low frequency band, the beam width of the directivity is wider than that in the medium frequency band. Consider a case in which a plurality of directivity directions in the low frequency band are the same as those in the medium frequency band in 4a of FIG. 4. In this case, as shown in 4b of FIG. 4, in the low frequency band, an overlapping width $\alpha_p$ of an overlapping area 305 is wider than the target width $\alpha_s$, and even if a sound in the overlapping area is extracted, sounds of the non-target sound sources 302 and 303 are undesirably mixed.

To cope with this, in this embodiment, the frequency dependency of the beam width $\alpha_d(f)$ is considered, as given by equation (6). More specifically, the plurality of directivity directions $\theta_d(f)$ [d=1 to D] are determined for each sub-band so that the overlapping width $\alpha_p$ of the overlapping area is almost constant (=target width $\alpha_s$) in each sub-band. This increases an angle formed by the plurality of directivity directions $\theta_d(f)$ [d=1 to D], as shown in 4c of FIG. 4, thereby extracting a sound in an overlapping area 306 having the overlapping width $\alpha_p$ equal to the target width $\alpha_s$. With this processing, in each sub-band, the sound of the target sound source 301 is separated by suppressing the sounds of the non-target sound sources 302 and 303.

In step S213, the separated sounds obtained in the respective frequency loops are added in the adder 124, and undergo inverse Fourier transform (for example, IFFT) in the IFFT unit 125, and thus an audio signal (separated sound) in the time domain is output. The output audio signal undergoes, for example, windowing, and is overlap-added with the separated sounds in time blocks up to the preceding time block, and the resultant separated sound is sequentially recorded in the storage unit 101. The thus obtained separated sound can be externally output via a data input/output unit (not shown), and reproduced by a reproduction unit (not shown) such as earphones, headphones, or a loudspeaker.

According to the above processing, processing of forming a plurality of directional beams so that the center direction of the overlapping area of the plurality of directional beams faces in the target direction and the overlapping width of the overlapping area becomes equal to or smaller than the target width is performed for each divided frequency band. That is, the plurality of directional beams have directivities in different directions for the components of the frequency bands. This controls the directivity direction so that the overlapping area of the plurality of directional beams becomes almost constant in each sub-band, thereby separating a sound of the target sound source.

With the branch processing in step S207, at a frequency at which the beam width of the directivity is equal to or smaller than the target width, the direction sound obtained with a single directivity is used intact as a separated sound (step S208). The processing of extracting a common component using the overlapping area of the plurality of directional beams is minimized, thereby suppressing degradation in sound quality.

Figure 5:
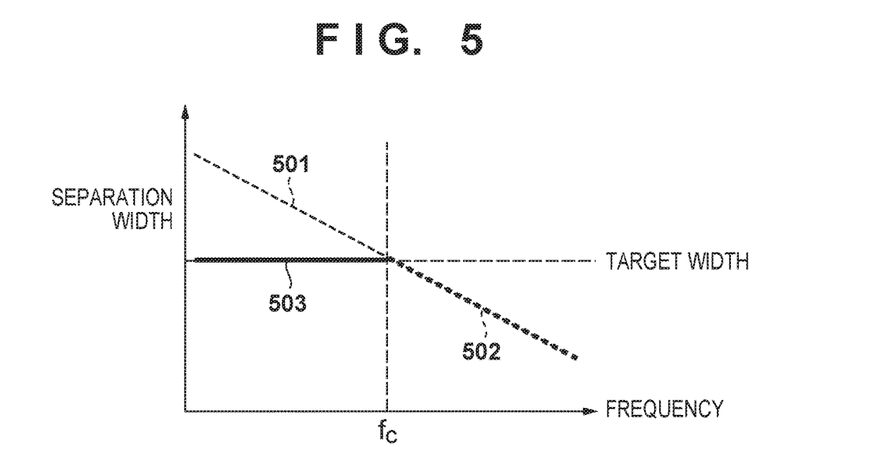
FIG. 5 is a graph for explaining the effect of directivity direction control according to the embodiment.

FIG. 5 is a graph schematically showing this concept. In FIG. 5, a separation width represented by the ordinate indicates an angle width within which the sound source can be separated and which is the beam width of a single directional beam or the overlapping width of the overlapping area of the plurality of directional beams. A broken line 501 schematically indicates the beam width of a single directional beam. In general, the beam width is narrower as the frequency of the audio signal is higher, and wider as the frequency is lower. Thus, by considering from the high frequency band, up to a frequency at which the beam width is equal to or smaller than the target width ($f \geq f_c$), a direction sound is obtained with a single directivity. At a frequency lower than that frequency ($f < f_c$), an overlapping area of the plurality of directional beams, whose overlapping width becomes equal to the target width, is formed. A thick broken line 502 corresponding to the beam width and a thick solid line 503 corresponding to the overlapping width schematically indicate control for each frequency.

Note that the various data held in advance in the storage unit 101 in the above embodiment may be externally input via the data input/output unit (not shown).

(Another Embodiment)

Since a storage unit 101 does not always hold the filter coefficient of a directivity forming filter corresponding to an arbitrary directivity direction, one of selectable directivity directions, in which the overlapping width of an overlapping area is closest to a target width (or equal to or smaller than the target width), may be selected.

Figure 6:
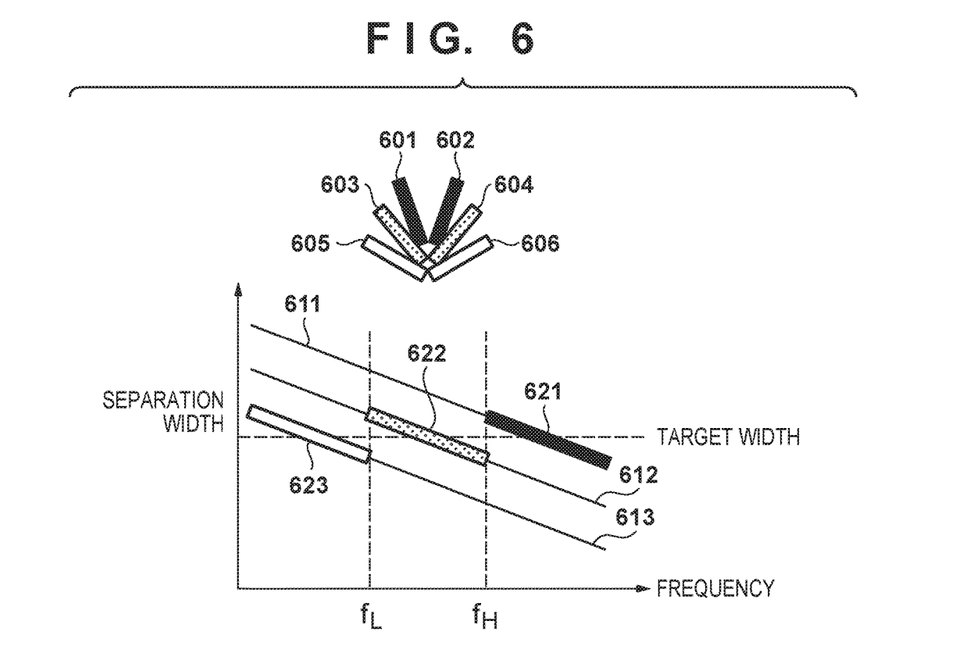
FIG. 6 is a graph for explaining an example of directivity direction control according to another embodiment.

A plurality of audio acquisition units 111 may be implemented by a directional microphone array in which a plurality of directional microphones are arranged. In this case, a signal processing apparatus 100 can directly set, as a direction sound corresponding to each directivity direction (axial direction), an audio signal acquired by each directional microphone. As shown in, for example, FIG. 6, a plurality of pairs each including directional microphones arranged at an angle at which the central axes of directivities face in different directions are included. In the plurality of pairs of directional microphones, the angles each formed by the central axes of the directivities are different. In the example of FIG. 6, three pairs of directional microphones are implemented by six directional microphones 601 to 606. Solid lines 611, 612, and 613 in the graph of FIG. 6 schematically indicate the overlapping widths of overlapping areas formed by the directivities of the three pairs of directional microphones 601 and 602, 603 and 604, and 605 and 606, respectively.

If a concept for making the overlapping area constant as much as possible in each sub-band is applied, a pair of directional microphones (corresponding to a pair of directivity directions) is selected for each sub-band so that the overlapping width of the overlapping area becomes close to the target width. That is, in the high frequency band ($f \geq f_H$), audio signals of the pair of directional microphones 601 and 602 whose axial directions form a small angle are used to extract their common component. In the medium frequency band ($f_L \leq f < f_H$), audio signals of the pair of directional microphones 603 and 604 whose axial directions form a medium angle are used to extract their common component. Furthermore, in the low frequency band ($f < f_L$), audio signals of the pair of directional microphones 605 and 606 whose axial directions form a large angle are used to extract their common component. Thick lines 621, 622, and 623 whose filling colors respectively correspond to the three pairs of directional microphones 601 and 602, 603 and 604, and 605 and 606 schematically indicate control for each frequency.

Figure 7:
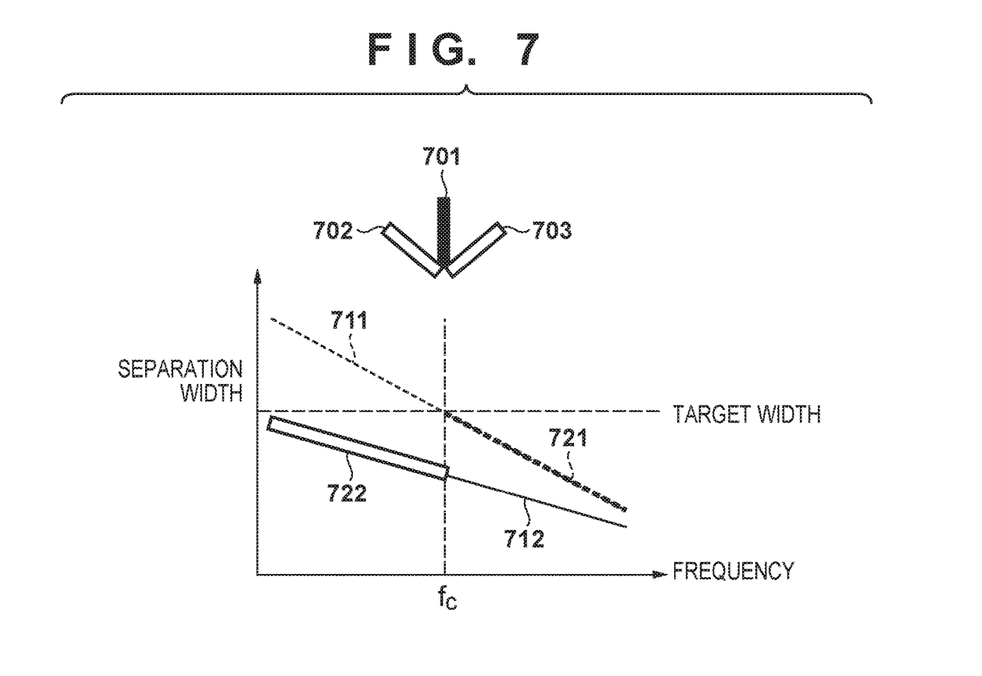
FIG. 7 is a graph for explaining another example of directivity direction control according to the other embodiment.

Note that the concept for directly using, as a separated sound, the direction sound obtained with a single directivity in a sub-band in which the beam width of the directivity is equal to or smaller than the target width can also be applied to the directional microphone array. As shown in, for example, FIG. 7, consider a directional microphone array including three directional microphones 701 to 703, in which the directional microphone 701 and the pair of directional microphones 702 and 703 are arranged so that their axial directions form angles. Referring to FIG. 7, a broken line 711 schematically indicates a beam width by the directivity of the directional microphone 701 and a solid line 712 schematically indicates the overlapping width of an overlapping area by the directivities of the pair of directional microphones 702 and 703.

Similarly to FIG. 5, by considering from the high frequency band, up to a frequency at which the beam width is equal to or smaller than the target width ($f \geq f_c$), a direction sound is obtained by an audio signal of the single directional microphone 701. At a frequency lower than that frequency ($f < f_c$), audio signals of the pair of directional microphones 702 and 703 such that the overlapping width of the overlapping area is equal to or smaller than the target width are used to extract their common component. A thick broken line 721 corresponding to the beam width and a solid-white line 722 corresponding to the overlapping width schematically indicate control for each frequency.

Figure 8:
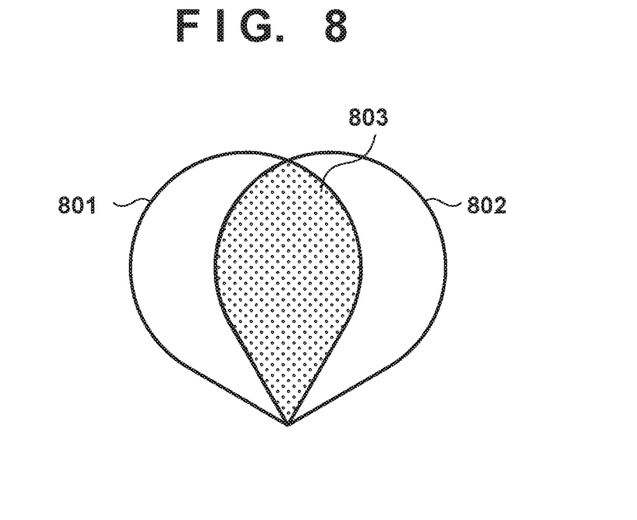
FIG. 8 is a view for explaining an example of an overlapping area according to the other embodiment.

Note that in the above-described embodiment, for the sake of simplicity, an overlapping width determined based on the beam width directions of the plurality of directional beams is used as an index of the size of the overlapping area in consideration of a beam width direction in which the attenuation from the directivity direction becomes equal to the predetermined value with respect to the beam patterns of the directivities. However, more realistically, the beam patterns of the directivities have shapes represented by directivities 801 and 802 in FIG. 8. Thus, more strictly, the size of a filled portion 803 may be directly calculated as an overlapping area.

Figure 9:
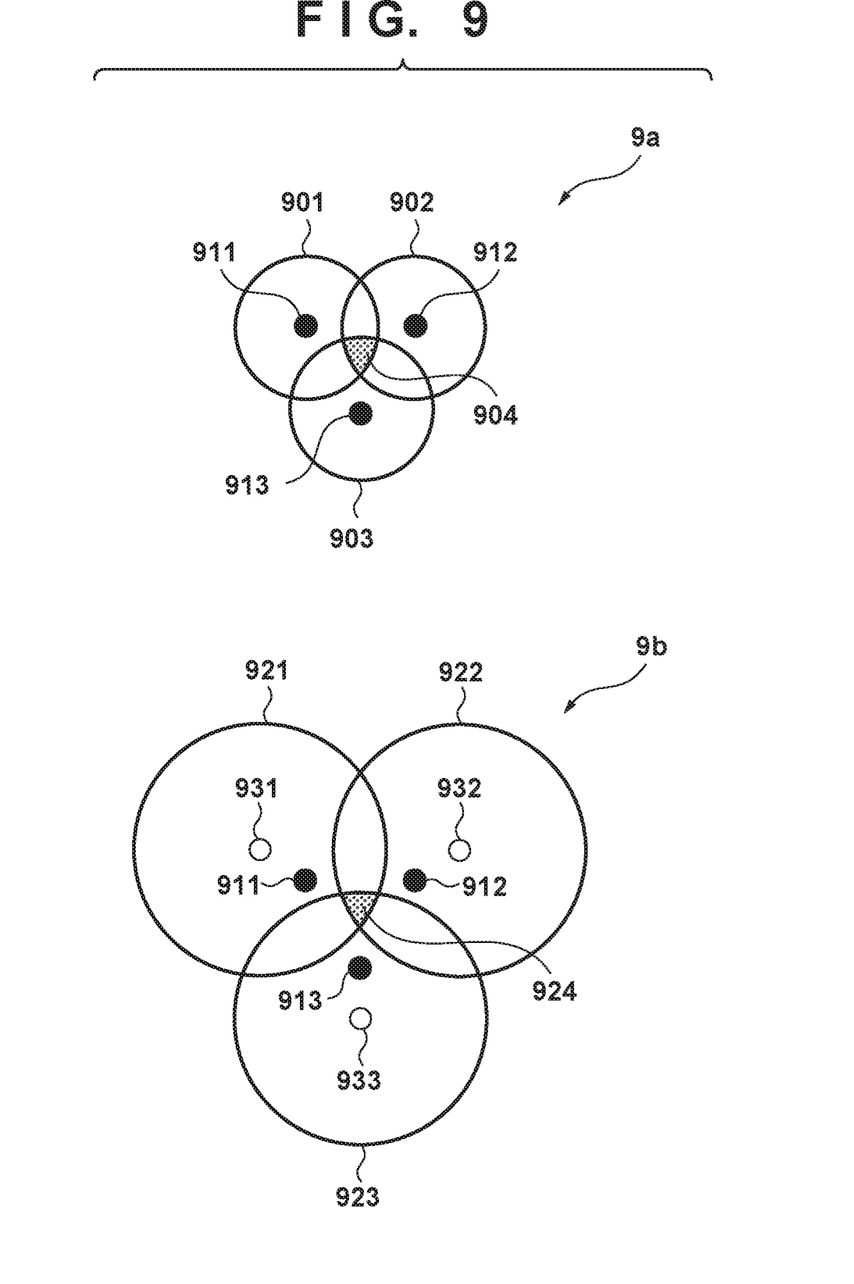
FIG. 9 is a view for explaining still another example of directivity direction control according to the other embodiment.

Note that the concept for making the overlapping area of the plurality of directional beams almost constant in each sub-band can be extended to a case in which the directivity count D is 3 or more. As shown in, for example, 9a of FIG. 9, a sound of the target sound source can be separated using three directional beams 901, 902, and 903. Each of the directional beams 901, 902, and 903 is a beam formed in a conical shape. Points 911, 912, and 913 in conic sections by a target plane represent intersection points with the target plane in the beam directions of the directional beams 901, 902, and 903, respectively. Similarly to the above-described embodiment, a sound of the target sound source can be separated using an overlapping area 904 of the three directional beams 901, 902, and 903. At a frequency lower than the frequency of audio signals shown in 9a of FIG. 9, beam widths are large, as indicated by directional beams 921, 922, and 923 in 9b of FIG. 9. If the respective beam widths become larger, the overlapping area is enlarged. To cope with this, similarly to the above-described embodiment, in the low frequency band, the angles formed by the beam directions of the directional beams 921, 922, and 923 are increased so that the intersection points 911, 912, and 913 move to intersection points 931, 932, and 933, respectively. This makes an overlapping area 924 equal to the overlapping area 904 shown in 9a of FIG. 9.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-124800, filed Jun. 23, 2016, which is hereby incorporated by reference herein in its entirety.

What is claimed is:
1. A signal processing apparatus comprising:
   at least one hardware processor; and
   a memory which stores instructions executable by the at least one hardware processor to cause the signal processing apparatus to perform at least;

extracting components for a plurality of different frequency bands from an audio signal acquired by a plurality of audio acquisition units;

forming, for each of the plurality of different frequency bands, at least one directional beam for generating a directional sound signal corresponding to a target direction, wherein a first directional beam and a second directional beam having different directivities respectively are formed for a frequency band among the plurality of different frequency bands, so that the target direction is included in an overlapping range where the first directional beam and the second directional beam overlap; and generating the directional sound signal corresponding to the target direction by processing, based on the at least one directional beam formed for each of the plurality of different frequency bands in the forming, each of the components for the plurality of different frequency bands extracted from the audio signal in the extracting.

2. The apparatus according to claim 1, wherein the in the forming, the first directional beam and the second directional beam are formed so that a center direction of the overlapping range faces in the target direction and an width of the overlapping range becomes not larger than a target width.

3. The apparatus according to claim 1, wherein the instructions further cause the signal processing apparatus to perform:

determining, based on a width of a directional beam for a frequency band formed based on a parameter stored in a storage, whether only one directional beam is formed for the frequency band or a plurality of directional beams are formed for the frequency band, wherein if the width of the directional beam is larger than a target width, it is determined that the plurality of directional beams is formed, and wherein in the forming, the at least one directional beam is formed for each of the plurality of different frequency bands according to a result of the determining.

4. The apparatus according to claim 3, wherein in a case where the width of the directional beam is not larger than the target width, the directional sound signal corresponding to the target direction is generated by applying a directivity forming filter which forms only one directional beam, and in a case where the width of the directional beam is larger than the target width, a plurality of sounds signals are obtained by applying a plurality of directivity forming filters which form the plurality of directional beams, and the directional sound signal corresponding to the target direction is generated by extracting a common component of the plurality of obtained sound signals.

5. The apparatus according to claim 2, wherein a width of a directional beam is provided based on a direction in which an attenuation in a beam pattern of the directional beam is equal to a predetermined value.

6. The apparatus according to claim 1, wherein the plurality of audio acquisition units include a plurality of pairs each including directional microphones which are arranged at an angle at which central axes of directivities face in different directions, and the angles of the plurality of pairs of directional microphones are different.

7. The apparatus according to claim 1, wherein the plurality of audio acquisition units include a single directional microphone, and a pair of directional microphones that are arranged to sandwich the single directional microphone at an angle at which central axes of directivities face in different directions.

8. The apparatus according to claim 2, wherein the instructions further causing the signal processing apparatus to perform:

determining the target direction and the target width based on the audio signals.

9. The apparatus according to claim 1, wherein in the forming, a third directional beam and a fourth directional beam having different directivities respectively are formed for another frequency band among the plurality of different frequency bands, so that the target direction is included in another overlapping range where the third directional beam and the fourth directional beam overlap, and wherein in a case where the frequency band corresponding to the first directional beam and the second directional beam is lower than the another frequency band corresponding to the third directional beam and the fourth directional beam, a difference between a central direction of the first directional beam and a central direction of the second directional beam is larger than a difference between a central direction of the third directional beam and a central direction of the fourth directional beam.

10. The apparatus according to claim 1, wherein in the forming, the first directional beam and the second directional beam and a third directional beam having different directivities respectively are formed for a frequency band among the plurality of different frequency bands, so that the target direction is included in an overlapping range where the first directional beam and the second directional beam and the third directional beam overlap.

11. A signal processing method comprising:

performing a first extraction for extracting a component for a first frequency band from an audio signal acquired by a first directional microphones;

performing a second extraction for extracting components for a second frequency band lower than the first frequency band from audio signals acquired by a second directional microphone and a third directional microphone faced in different directions respectively; and generating a directional audio signal corresponding to a target direction, based on the component for the first frequency band extracted by the first extraction and the components for the second frequency band extracted by the second extraction, wherein the target direction is a direction in which the first directional microphone is faced, and wherein the target direction is an Intermediate direction between a direction in which the second directional microphone is faced and a direction in which the third directional microphone is faced.

12. A computer-readable storage medium having a program stored thereon for performing a signal processing method, the method comprising:

extracting components for a plurality of different frequency bands from audio signal acquired by a plurality of audio acquisition units;

forming, for each of the plurality of different frequency bands, at least one directional beam for generating a directional sound signal corresponding to a target direction, wherein a first directional beam and a second directional beam having different directivities respectively are formed for a frequency band among the plurality of different frequency bands, so that the target direction is included in an overlapping range where the first directional beam and the second directional beam overlap; and generating the directional sound signal corresponding to the target direction by processing, based on the at least one directional beam formed for each of the plurality of different frequency bands in the forming, each of the components for the plurality of different frequency bands extracted from the audio signal in the extracting.

* * * * *